(12) United States Patent
Umebayashi et al.

(10) Patent No.: US 7,487,366 B2
(45) Date of Patent: Feb. 3, 2009

(54) DATA PROTECTION PROGRAM AND DATA PROTECTION METHOD

(75) Inventors: Yuu Umebayashi, Tokyo (JP); Etsu Den, Tokyo (JP); Yusuke Yamanaka, Tokyo (JP); Takaoki Sasaki, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 506 days.

(21) Appl. No.: 10/409,443

(22) Filed: Apr. 9, 2003

(65) Prior Publication Data

US 2004/0010701 A1    Jan. 15, 2004

(51) Int. Cl.
*G06F 11/30*    (2006.01)

(52) U.S. Cl. .................................. 713/193
(58) Field of Classification Search ............ 713/193
See application file for complete search history.

(56) References Cited

U.S. PATENT DOCUMENTS

| | | | |
|---|---|---|---|
| 4,652,990 A * | 3/1987 | Pailen et al. | 705/56 |
| 5,201,000 A * | 4/1993 | Matyas et al. | 380/30 |
| 5,412,717 A | 5/1995 | Fischer | |
| 5,574,917 A * | 11/1996 | Good et al. | 712/220 |
| 5,677,952 A | 10/1997 | Blakley, III et al. | |
| 5,915,025 A | 6/1999 | Taguchi et al. | |
| 6,044,155 A * | 3/2000 | Thomlinson et al. | 713/155 |
| 2003/0037237 A1 * | 2/2003 | Abgrall et al. | 713/166 |

FOREIGN PATENT DOCUMENTS

| | | |
|---|---|---|
| JP | 2001-350663 | 12/2001 |
| JP | 2002-009762 | 1/2002 |
| JP | 2002-041347 | 2/2002 |
| JP | 2002-505476 | 2/2002 |
| JP | 2002-506247 | 2/2002 |
| WO | WO 99/44137 | 9/1999 |
| WO | WO 99/45454 | 9/1999 |

OTHER PUBLICATIONS

PKCS #5 v2.0: Password-based Cryptography Standard, RSA Laboratories, Mar. 25, 1999. URL: ftp://ftp.rsasecurity.com/pub/pkcs/pkcs-5v2/pkcs5v2-0.pdf.*

(Continued)

*Primary Examiner*—Kambiz Zand
*Assistant Examiner*—Farid Homayounmehr
(74) *Attorney, Agent, or Firm*—Staas & Halsey LLP

(57) ABSTRACT

A data protection program is able to effectively restrict an unauthorized access to a resource to be protected even when the resource to be protected is in a state legitimately accessed by a user. The identification information about a program capable of accessing the resource to be protected is registered in an access permission management table. If an access request to access the resource to be protected is subsequently received, then identification information about a request source program which has outputted the access request is acquired. Then, it is determined whether access to the resource to be protected is permitted or not based on whether the identification information about the request source program has been registered in the access permission management table or not. If access to the resource to be protected is permitted, data in the resource to be protected is processed in response to the access request.

5 Claims, 18 Drawing Sheets

OTHER PUBLICATIONS

Japanese Patent Abstract No. 10-254783 dated Sep. 25, 1998.
Japanese Patent Abstract No. 11-143840 dated May 28, 1999.
Japanese Patent Abstract No. 2000-066956 dated Mar. 3, 2000.

European Search Report in corresponding European Appln. No. 03 25 2149.
Japanese Office Action mailed on Dec. 5, 2006 for corresponding Japanese Patent Application No. 2002-199437.

* cited by examiner

210 ACCESS PERMISSION MANAGEMENT TABLE

| CLIENT IDENTIFIER | ENCRYPTION KEY | RESOURCE PERMITTED TO BE ACCESSED |
|---|---|---|
| CLIENT A | KEY α | FOLDER a |
| CLIENT B | KEY α | FOLDER a |
| CLIENT C | KEY β | FOLDER a |
| CLIENT A | KEY α | FOLDER b |
| . . | . . | . . |

FIG. 4

[WHEN CLIENT IDENTIFIER IS REGISTERED]

PROTECTION BY ENCRYPTION

[WHEN CLIENT IDENTIFIER IS NOT REGISTERED]

[PROCESS OF REGISTERING FOLDER TO BE MONITORED]

[PROCESS OF REGISTERING APPLICATION]

[PROCESS OF REGISTERING APPLICATION]

DATA PROTECTION PROGRAM AND DATA PROTECTION METHOD

BACKGROUND OF THE INVENTION (1) Field of the Invention:

The present invention relates to a data protection program and data protection method for protecting data, and more particularly to a data protection program and data protection method for restricting access to resources to be protected.

(2) Description of the Related Art:

Computer systems are occasionally shared among a plurality of users. When a computer system is shared among a plurality of users, it is necessary limit the resources that can be used by the users in order to protect the data of some users from careless mistakes and unauthorized actions by other users.

Conventional computer systems receive authentication information including user name and password from a user, authenticate the user based on the received authentication information, and permit the authenticated user to access to the limited resources which have been authorized in advance for the user to access thereto. In this manner, the user is given selective access to the resources provided by the computer systems. While the above authenticating process is basically carried out on a user-by-user basis, the same authenticating process may be carried out on a group-of-users basis to provide selective access and information sharing for each of such groups.

Heretofore, it has been necessary that all authenticating operations for selective access be sorted out and planned according to a top-down procedure by the system administrator. However, the top-down selective access implementation approach as mentioned above is disadvantageous in that it involves a large expenditure of time and labor in an initial phase of system operation planning because the system administrator needs to plan in advance contents of information to be shared among users, and each user is unable to make finer access limitation settings of its own will.

In view of the above shortcomings, it has been proposed to allow system users to make more defined document protection processing based on a bottom-up approach. According to one proposal, a user encrypts a file stored in a storage device with a file encryption application to prevent the file from being used by an unauthorized third party.

According to a general file encryption process, a document file prepared by a user using an application such as a document generating application, e.g., a word processing program, is stored directly in a storage device, and thereafter the document stored in the storage device is encrypted.

When document files generated using such an application are stored directly in a storage device, the document files is temporarily left unprotected in the storage device. In order to mitigate the unprotected state of the stored document files, there has been considered a process for monitoring access to a storage device in a computer system used by users, and automatically encrypt a document file while or immediately after the document file is stored in the storage device.

According to the above process, if a storage destination (e.g., a directory) for a document file is to be encrypted, then the document file is encrypted using an encryption key associated with the storage destination without user awareness of encryption. The encrypted document file is decrypted when it is read from the storage destination. The document file is encrypted and decrypted only while the mechanism for monitoring access to the storage destination is in operation. The encrypted document files are protected from unauthorized use by operating the access monitoring mechanism only while a particular application is in an activated state.

However, if the access monitoring mechanism automatically encrypts and decrypts document files, then it is possible for a malicious third party to read encrypted document files during operation of the access monitoring mechanism. Specifically, while an application A which has activated the access monitoring mechanism is accessing the storage destination, an application B can also access the storage destination and read a decrypted document file.

Even if the application A acts to limit the user access, insofar as the access monitoring mechanism has been activated under the control of the application A, an encrypted document file can be read from the storage destination based on a copy request or the like from the application B. At this time, the document file read by the application B is also decrypted by the access monitoring mechanism. Thus, there arises a problem that a third party can fetch decrypted information from the storage destination.

This allows fraud operations such that a user with an access right activates the access monitoring mechanism with the application A and reads a document file using the other application B. For example, even if the application A poses an access restriction for permitting only the registration of data, a user who is allowed to use the application A can easily read data using the application B through such a fraud operation.

SUMMARY OF THE INVENTION

It is therefore an object of the present invention to provide a data protection program and data protection method for effectively preventing unauthorized access to a resource to be protected even while authorized access is being made to the resources.

To achieve the above object, there is provided a data protection program for protecting data stored in a resource to be protected. The data protection program allows a computer to carry out a processing sequence comprising registering identification information about a program capable of accessing the resource to be protected in an access permission management table, if an access request to access the resource to be protected is received, acquiring identification information about a request source program which has outputted the access request, determining whether access to the resource to be protected is permitted or not based on whether the identification information about the request source program has been registered in the access permission management table or not, and if access to the resource to be protected is permitted, processing data in the resource to be protected in response to the access request.

To achieve the above object, there is also provided a method of protecting data stored in a resource to be protected, the method comprising registering identification information about a program capable of accessing the resource to be protected in an access permission management table, if an access request to access the resource to be protected is received, acquiring identification information about a request source program which has outputted the access request, determining whether access to the resource to be protected is permitted or not based on whether the identification information about the request source program has been registered in the access permission management table or not, and if access to the resource to be protected is permitted, processing data in the resource to be protected in response to the access request.

The above and other objects, features, and advantages of the present invention will become apparent from the following description when taken in conjunction with the accompa-

BRIEF DESCRIPTION OF THE DRAWINGS

FIG. 4 is a diagram showing a data structure of an access permission management table;

DESCRIPTION OF THE PREFERRED EMBODIMENTS

Hereinafter, an exemplary embodiment of the present invention will be explained with reference to the attached drawings. First, the outline of the present invention applied to the embodiment will be described, then specific details of the embodiment will be given.

Figure 1:
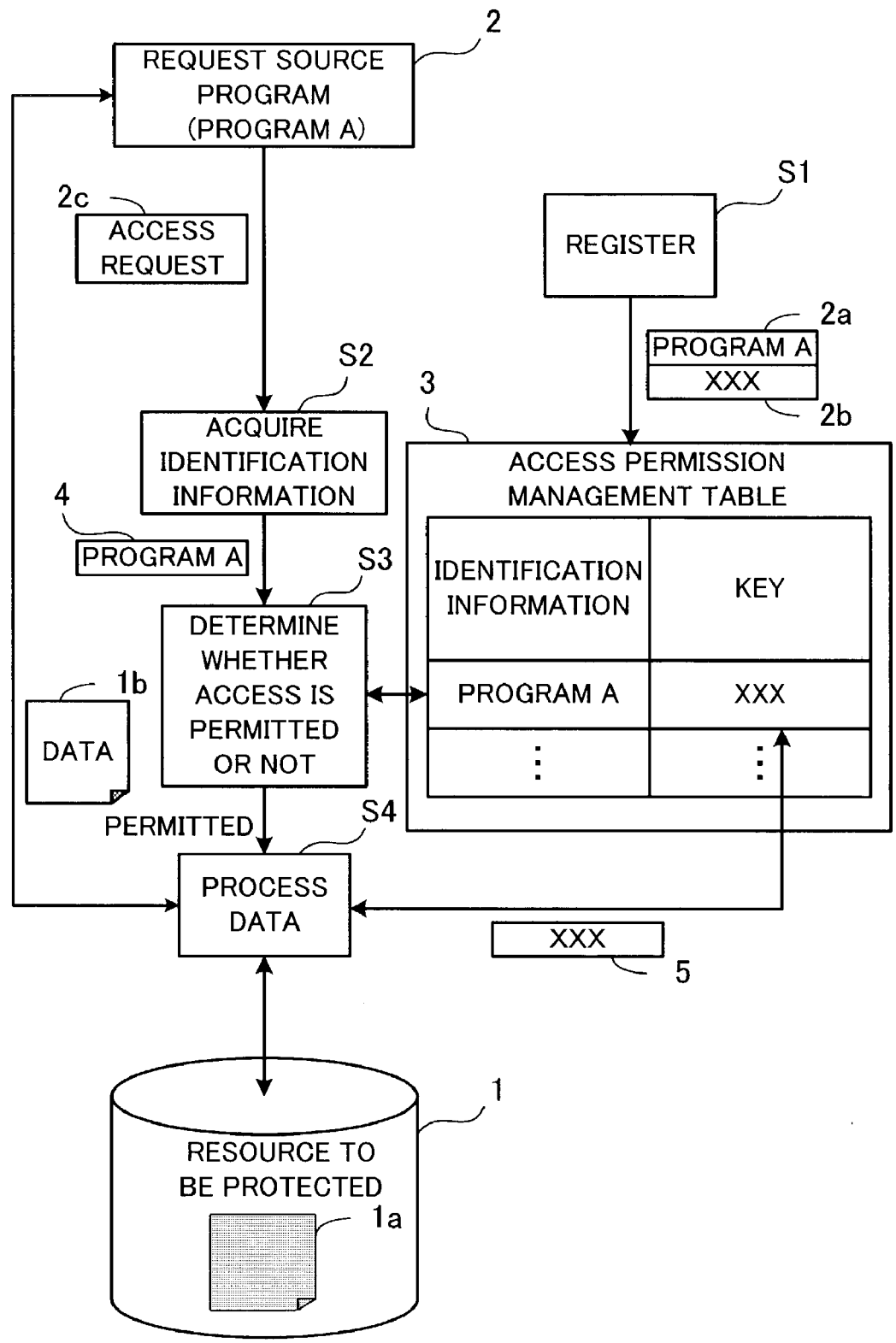
FIG. 1 is a block diagram showing the concept of the present invention.

FIG. 1 shows in block form the concept of the present invention. As shown in FIG. 1, a data protection program according to the present invention is intended for monitoring access to a resource 1 to be protected and protecting data 1a stored in the resource 1, and allows a computer to perform a process described below. In the example shown in FIG. 1, it is assumed that the data 1 is stored in an encrypted form in the resource 1 for protecting itself from unauthorized access.

First, identification information 2a about a program which can access the resource 1 is registered in an access permission management table 3 (step S1). In the example shown in FIG. 1, "program A" is registered as identification information 2a about a program which can access the resource 1. Identification information about a program may be the program name of the program, the process name of a process for carrying out the program, the identifier of the process (process ID (Identification)), the activation time of the process, etc.

Upon registering the identification information 2a, a key 2b is registered in association with the identification information 2a into the access permission management table 3. The key 2b may be a value which is uniquely determined from a password entered by the user when a request source program 2 is activated. Therefore, it is ensured that the same key will not be produced unless the same password is entered.

Thereafter, when an access request 2c for accessing to the resource 1 is received, identification information 4 about the request source program 2 which has outputted the access request 2c is acquired (step S2).

The access request 2c for access to the resource 1 can be detected by monitoring access to the resource 1. For example, the name (a drive name, a folder name, a device name, etc.) of a resource which is an access destination in the access request is monitored, and correspondence between the monitored name and the name of the resource 1 is verified.

Then, it is determined whether the access to the resource 1 is permitted or not based on whether the identification information 4 about the request source program 2 has been registered in the access permission management table 3 or not (step S3). In the example shown in FIG. 1, since the identification information 2a of the request source program 2 has been pre-registered, the access to the resource 1 is permitted. If an access request is issued from a program whose identification information has not been registered in the access permission management table 3, then its access request is rejected.

If the access to the resource 1 is permitted, then the data 1a in the resource 1 is processed in response to the access request 2c (step S4). For example, if the access request 2c is a request to write data 1b generated by the request source program 2, then a key 5 associated with the identification information 4 is taken from the access permission management table 3, and the data 1b is encrypted using the key 5. The encrypted data 1a is then stored in the resource 1. If the access request 2c is a request to read the data 1a, then a key 5 associated with the identification information 4 is taken from the access permission management table 3, and the encrypted data 1a is decrypted using the key 5. The decrypted data 1b is then transferred to the request source program 2.

During such processing is executed on the computer in accordance with the data protection program as mentioned above, access is permitted only when the identification information 4 about the request source program 2 which has outputted the access request 2c is pre-registered in the access permission management table 3, and data in the resource 1 is accessed depending on the access request 2c.

Further, when identification information is registered in the access permission management table 3, a key to be used for encrypting and decrypting data is also registered in the access permission management table 3 in combination with the identification information. Therefore, even if an unauthorized third party registers identification information about its own program in the access permission management table 3 for manipulation purposes, the data 1a in the resource 1 cannot be decrypted unless the identity of the key is validated. As a result, the safety of the data 1a in the resource 1 is guaranteed.

Keys that can be registered in the access permission management table 3 may comprise inputs, used as parameters, from programs which are permitted to access the access permission management table 3, group keys of groups of predetermined users, and values (hard disk IDs, hard token IDs, etc.) unique to local machines on which the file protection system operates, the values being involved in a key generation logic.

The system administrator of a computer with the above data protection program installed therein gives a user who is allowed to access protected data an authorization to use programs which are permitted to access the resource 1. An authorization to use a program can be given to a user, for example, according to the following process:

In order to give an authorization to use a program to a user, information as to a resource to be protected and information as to applications which are allowed to access the resource are associated with each other and registered in a table file or the like. Information as to users having an authorization to use application programs is registered as authentication information for each of the application programs in the table file or the like.

By giving a user an authorization to use programs, the user is allowed to access a protected resource which can be accessed by the programs that the user can use such as for inputting or outputting data. For example, when a computer system according to the present invention accepts an instruction to activate an application program from a user, the computer system refers to a table file which contains registered information about a resource to be protected, registered information about application programs, and registered authentication information, and confirms based on the registered information in the table file whether the user is a legitimate user of the application program and whether the application program is an application program capable of accessing the resource. If the application program capable of accessing the resource is activated by the legitimate user, then the computer system generates a key and registers the key in the access permission management table 3. In this manner, each user can access only a resource which the user is authorized to use.

A file or other data which is stored in the resource 1 by a certain application is encrypted using a key that is generated by the application. Therefore, an attempt to access a file stored in the resource 1 from an application that is not legitimately activated fails to decrypt the file. As a result, it is possible to prevent and monitor the unauthorized processing and leakage of information based on an operation according to a program that is not permitted to access the resource 1. Stated otherwise, a legitimate user who is permitted to access information of the file is inhibited from unauthorized control of the resource 1 through an unauthorized operation via a program that is not desired by the system administrator.

The exemplary embodiment of the present invention will be specifically described below.

Figure 2:
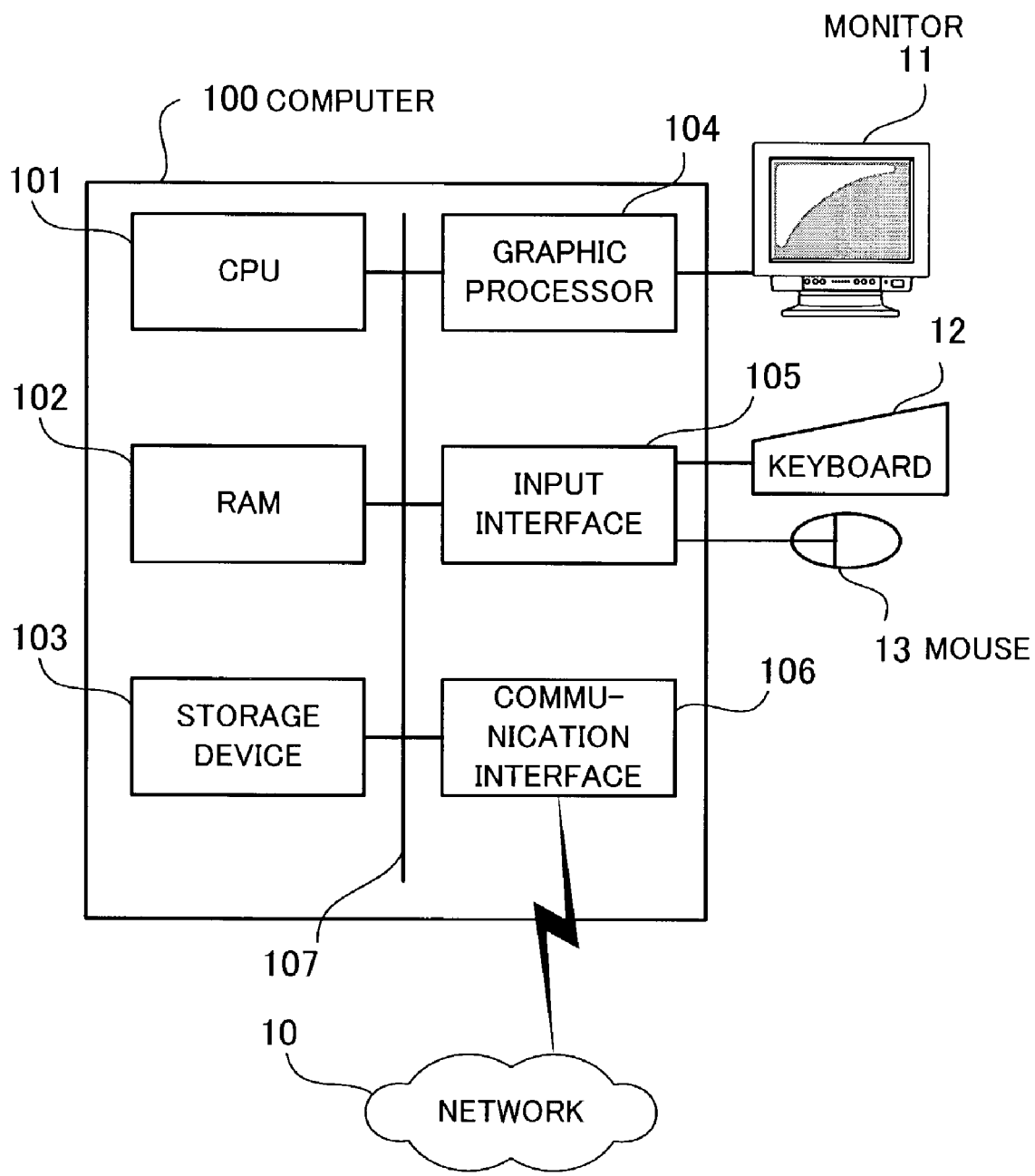
FIG. 2 is a block diagram of a hardware arrangement of a computer which is used in an embodiment of the present invention.

FIG. 2 shows in block form a hardware arrangement of a computer 100 which is used in the embodiment of the present invention. The computer 100 is controlled in its entirety by a CPU (Central Processing Unit) 101. The CPU 101 is connected with a RAM (Random Access Memory) 102, storage device 103, graphic processor 104, input interface 105, and communication interface 106 via a bus 107.

The RAM 102 temporarily stores at least part of an OS (Operating System) program and application program that are executed by the CPU 101. The RAM 102 also stores various data required for the processing by the CPU 101. The storage device 103, which may comprise, for example, a hard disk drive (HDD), stores the OS, various driver programs, and application programs.

A display monitor 11 is connected to the graphic processor 104. The graphic processor 104 displays images on the screen of the display monitor 11 according to instructions from the CPU 101. A keyboard 12 and a mouse 13 are connected to the input interface 105. The input interface 105 transmits signals entered from the keyboard 12 and the mouse 13 to the CPU 101 via the bus 107.

The communication interface 106 is connected to a network 10. The communication interface 106 sends data to and receives data from other computers via the network 10.

The above hardware arrangement is able to perform processing functions according to the embodiment of the present invention. In order to perform the processing functions according to the embodiment of the present invention, a driver program is installed in the computer 100. Processing functions that are performed when the computer 100 executes the driver programs will hereinafter be referred to as "driver", and functions that are performed when the computer 100 executes the application programs as "application".

The processing functions which are constructed on the computer 100 in order to achieve a file protecting function according to the embodiment of the present invention will be described below.

Figure 3:
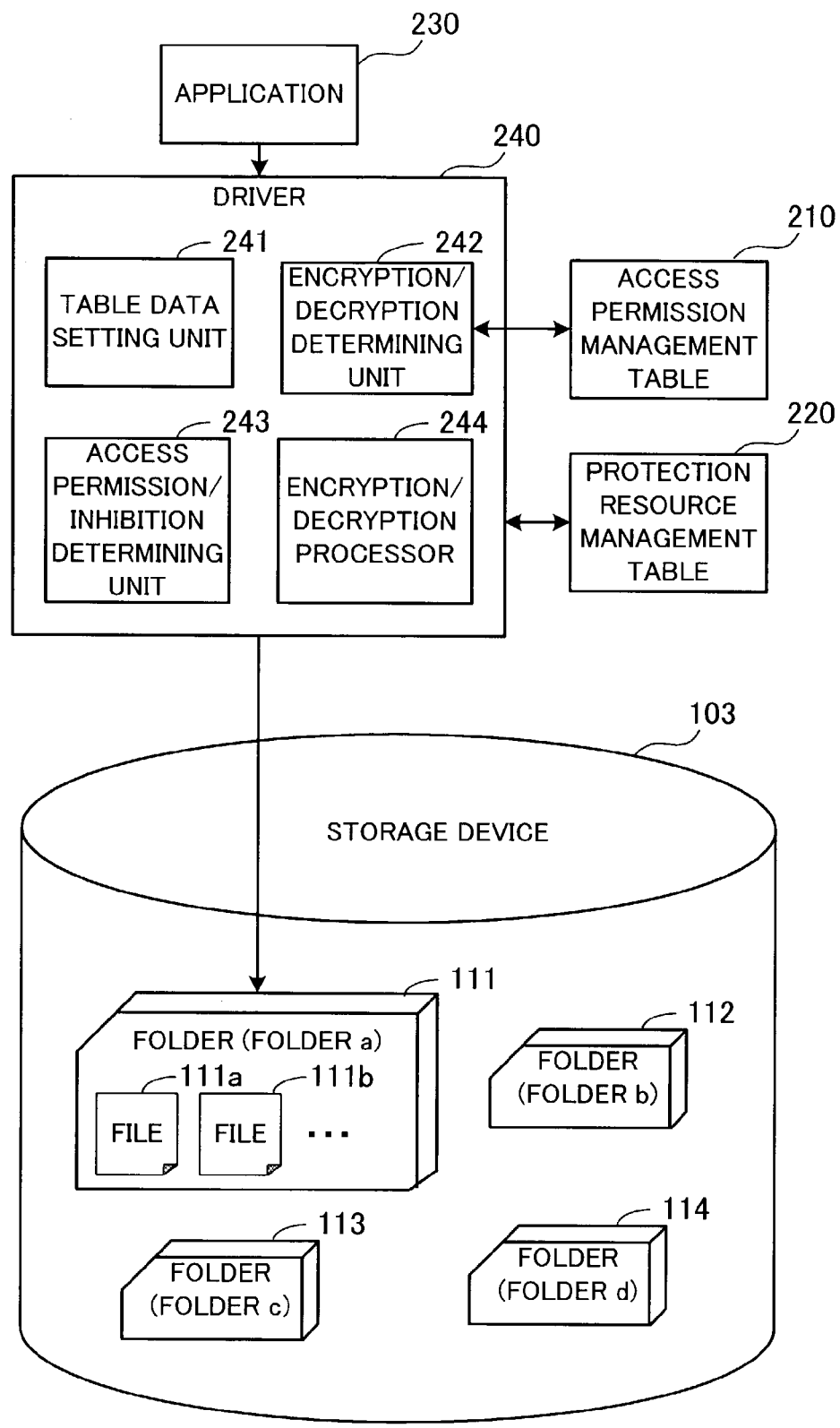
FIG. 3 is a block diagram of an arrangement for providing a file protecting function.

FIG. 3 shows in block form an arrangement for performing the file protecting function. As shown in FIG. 3, the computer 100 comprises an access permission management table 210, a protection resource management table 220, an application 230, and a driver 240. It is assumed according to the embodiment of the present invention that the protected resources can be specified on a folder (directory) basis. Therefore, any desired folder can be specified as a protection resource from among a plurality of folders 111 through 114 that are defined by a file system in connection with the storage device 103. The folder 111 contains a plurality of files 111a, 111b, . . . . The other folders 112 through 114 also contain various files. In the example shown in FIG. 3, the folder 111 has identification information "folder a", the folder 112 has identification information "folder b", the folder 113 has identification information "folder c", and the folder 114 has identification information "folder d".

The access permission management table 210 contains registered information which is used as a criteria for determining whether an application is an application that is permitted to access the storage device 103. Specifically, the registered information includes identification information of applications, encryption keys, and resources for permitting applications to access the storage device 103.

The protection resource management table 220 contains identification information about resources to be protected. For example, the identification information may be the names of folders that serve as resources to be protected.

The application 230 has a function to provide a service according to a request from a user. For example, the application 230 may be any of various programs including a word processor, a spreadsheet program, etc. The application 230 generates a file in response to a control input from the user. For storing a generated file in the storage device 103, the application 230 outputs an access request to write the generated file in the storage device 103. For referring to a file stored in the storage device 103, the application 230 outputs an access request to read the file to be referred to.

For protecting a file that the application 230 has generated, the application 230 receives a password entered by the user and performs user authentication. The application 230 generates a key that is uniquely determined depending on the entered password, and sets identification information of the application 230, the key, and identification information of a folder to be accessed in the access permission management table 210 through the driver 240.

When the application 230 outputs an access request to write a file, the driver 240 stores the file in the storage device

103. If a folder as a storage destination for the file is specified as a resource to be protected and access from the application 230 to the folder as a storage destination is permitted, then the driver 240 encrypts the file to be stored in the folder.

When the application 230 outputs an access request to read a file, the driver 240 acquires the file from the storage device 103 and transfers the file to the application 230. If a folder which is storing the file is specified as a resource to be protected and access from the application 230 to the folder as a storage destination is permitted, then the driver 240 decrypts the acquired file.

In order to enter files into and take files from folders that serve as resources to be protected, the driver 240 has a data table setting unit 241, an encryption/decryption determining unit 242, an access permission/inhibition determining unit 243, and an encryption/decryption processor 244.

The data table setting unit 241 registers data in and deletes data from the access permission management table 210 and the protection resource management table 220 in response to a request such as a folder monitoring request from the application 230.

The encryption/decryption determining unit 242 determines whether a file needs to be encrypted or decrypted in response to a file access request (a file storage request or a file reference request) from the application 230. Specifically, the encryption/decryption determining unit 242 determines whether an access destination (a folder in a file storage destination or a folder storing a file to be referred to) in the file access request has been specified as a resource to be protected in the protection resource management table 220. If the access destination is a resource to be protected, then the encryption/decryption determining unit 242 judges that the file needs to be encrypted or decrypted.

If the encryption/decryption determining unit 242 judges that a file needs to be encrypted or decrypted, then the access permission/inhibition determining unit 243 acquires identification information about the application 230 which has outputted the file access request for the file. The identification information may be, for example, an identifier (process ID) of the process which is executing the application 230. Then, the access permission/inhibition determining unit 243 determines whether the file access request for the resource to be protected is to be permitted or not. Specifically, if information matching a combination of the identification information about the application and the folder of the access destination is registered in the access permission management table 210, then the access permission/inhibition determining unit 243 permits accessing the file.

If the access permission/inhibition determining unit 243 permits a file access request for the resource to be protected, then the encryption/decryption processor 244 encrypts or decrypts the file specified by the file access request. Specifically, if the file access request is a file storage request, then the encryption/decryption processor 244 encrypts the file specified by the file access request and stores the encrypted file in the specified folder to be protected. If the file access request is a file reference request, then the encryption/decryption processor 244 extracts the specified file from the folder to be protected, and decrypts the file.

Specific details of the data stored in the access permission management table 210 and protection resource management table 220 will be described below.

FIG. 4 shows a data structure example of the access permission management table 210. The access permission management table 210 has a column of client identifiers, a column of encryption keys, and a column of resources to which access is permitted. Items of information that are disposed in juxtaposed relationship in rows across the columns are related to each other.

The column of client identifiers contains identification information (client identifiers) of processing functions such as the application 230 executed as a client. The client identifiers may be process IDs or execution file names, for example. In the present embodiment, the process IDs of processes operating as clients are set in the column of client identifiers.

The column of encryption keys contains keys of predetermined data length. Each key represents information that is uniquely generated from a password which is entered by the user when use of the application 230 is permitted. Therefore, one key is essentially generated only from one password.

The column of resources to which access is permitted contains identification information about resources to which access is permitted in association with combinations of client identifiers and keys. In the example shown in FIG. 4, folder names are set as resources to which access is permitted. The folder names that are set in this column include paths to the folders on the file system.

In the example shown in FIG. 4, the client identifier "client A" is associated with "key α" as the encryption key and "folder a" as the resource to which access is permitted.

Figure 5:
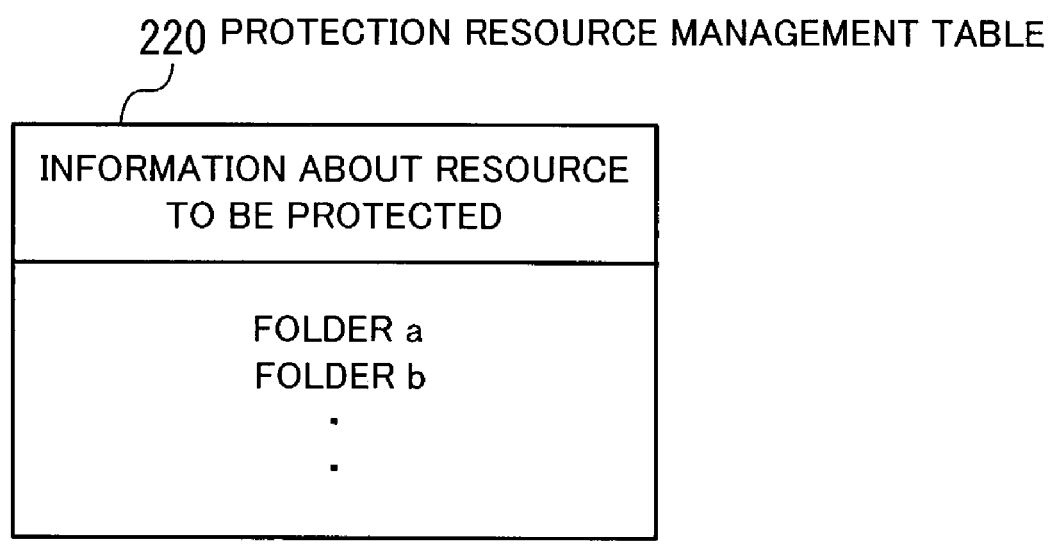
FIG. 5 is a diagram showing a data structure of a protection resource management table.

FIG. 5 shows a data structure example of the protection resource management table 220. The protection resource management table 220 comprises a column of protection resource information. The column of protection resource information contains identification information of resources to be protected. In the present embodiment, folder names are set as resources to be protected. The folder names that are set in this column include paths to the folders on the file system. In the example shown in FIG. 5, the folder 111 whose identification information is represented by "folder a" and the folder 112 whose identification information is represented by "folder b" are set as resources to be protected.

Of access requests for the protection resources (e.g., folders) registered in the protection resource management table 220, only those processing requests from clients whose client identifiers have been set in the access permission management table 210 are executed. Different processes that are carried out when a client identifier has been registered in the access permission management table 210 and when a client identifier has not been registered in the access permission management table 210 will be described below.

Figure 6:
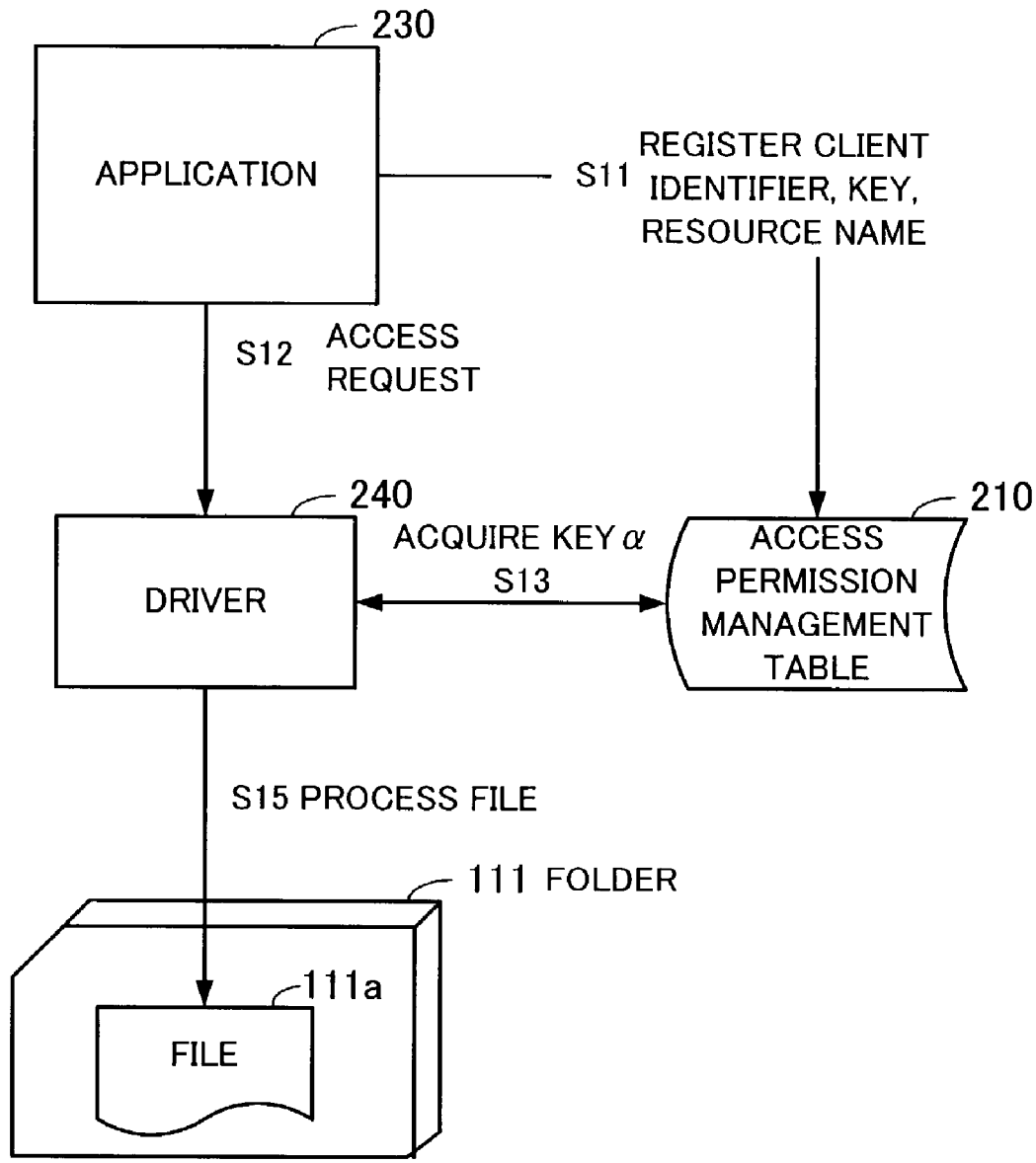
FIG. 6 is a diagram schematically showing an accessing process which is carried out when a client identifier is registered.

FIG. 6 schematically shows an accessing process which is carried out when a client identifier has been registered. When the user activates the application 230 and enters a proper password as user authentication information, the application 230 registers a client identifier (process ID), a key, and a resource name (folder name) in the access permission management table 210 via the driver 240 in step S11.

For example, it is assumed that information about resources to be protected and information about application programs which are allowed to access those resources to be protected have been associated with each other and registered in a table file, and that information of users (including passwords and user identifiers) who are authorized to use each of the application programs has been registered as authentication information in the table file. When a user enters a password, the user is authenticated depending on whether the user password is registered in the table file of authentication information or not. If the user is judged as a legitimate user, then a resource to be protected to which access is permitted from the application program that the user is authorized to use is determined based on the table file which contains the information about resources to be protected and information about application programs in association with each other. The client identifier (process ID) of the process which executes the application program and the key depending on the password are associated with the resource name (folder name) of the resource to be protected, and registered in the access permission management table 210.

Thereafter, the application 230 outputs an access request for the file 111*a* in the folder 111 in step S12. The access request may comprise a request to generate the file 111*a*, a request to refer to the file 111*a*, a request to update the file 111*a*, and a request to delete the file 111*a*. The access request which is outputted from the application 230 is transferred to a driver 240.

The driver 240 acquires the process ID of the application 230 in response to the access request which is outputted from the application 230. The driver 240 refers to the access permission management table 210, and retrieves therefrom a client identifier corresponding to the acquired process ID. The driver 240 then acquires a key α corresponding to the retrieved client identifier in step S13.

The driver 240 processes the file 111*a* specified by the access request while encrypting or decrypting the file 111*a* with the acquired key α in step S15. For example, if the access request is a request to generate and save the file 111*a*, then the driver 240 encrypts data transferred from the application 230 with the key α and stores the encrypted data as a file 111*a* in the folder 111.

If the access request is a request to refer to a file 111*a* already stored in the folder 111, then the driver 240 decrypts the file 111*a* into plaintext data with the key α and transfers the plaintext data to the application 230.

Figure 7:
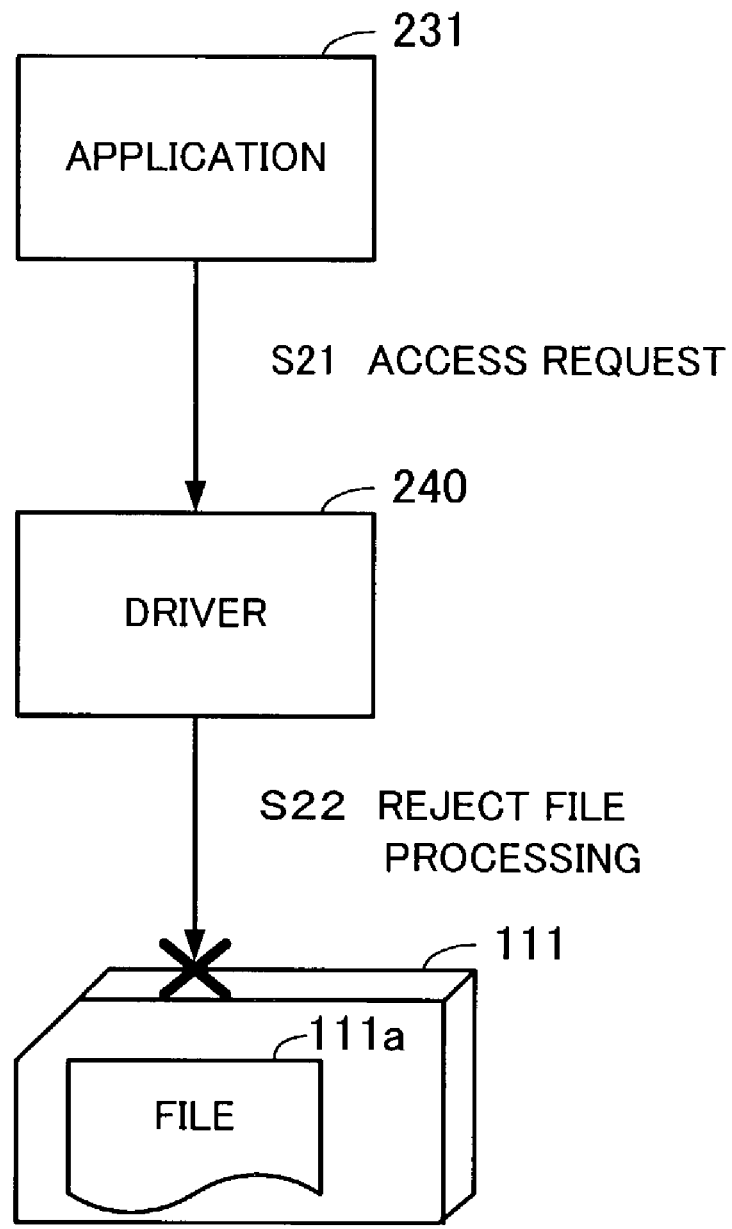
FIG. 7 is a diagram schematically showing an accessing process which is carried out when a client identifier is not registered.

FIG. 7 shows an accessing process which is carried out when a client identifier is not registered. For example, assume the case that an application 231 outputs an access request for the file 111*a* in the folder 111 without registering its client identifier in the access permission management table 210 in step S21. As the client identifier of the application 231 has not been registered in the access permission management table 210, the driver 240 rejects the processing of the file 111*a* in response to the access request in step S22.

As described above, with the client identifier (process ID) of the application 230 and the corresponding key being registered in advance, the file 111*a* in the folder 111 that has been specified upon registration of the client identifier and key is protected from the other application 231.

Details of a process for specifying a resource to be protected and processing a file in a protected state will be described below.

Figure 8:
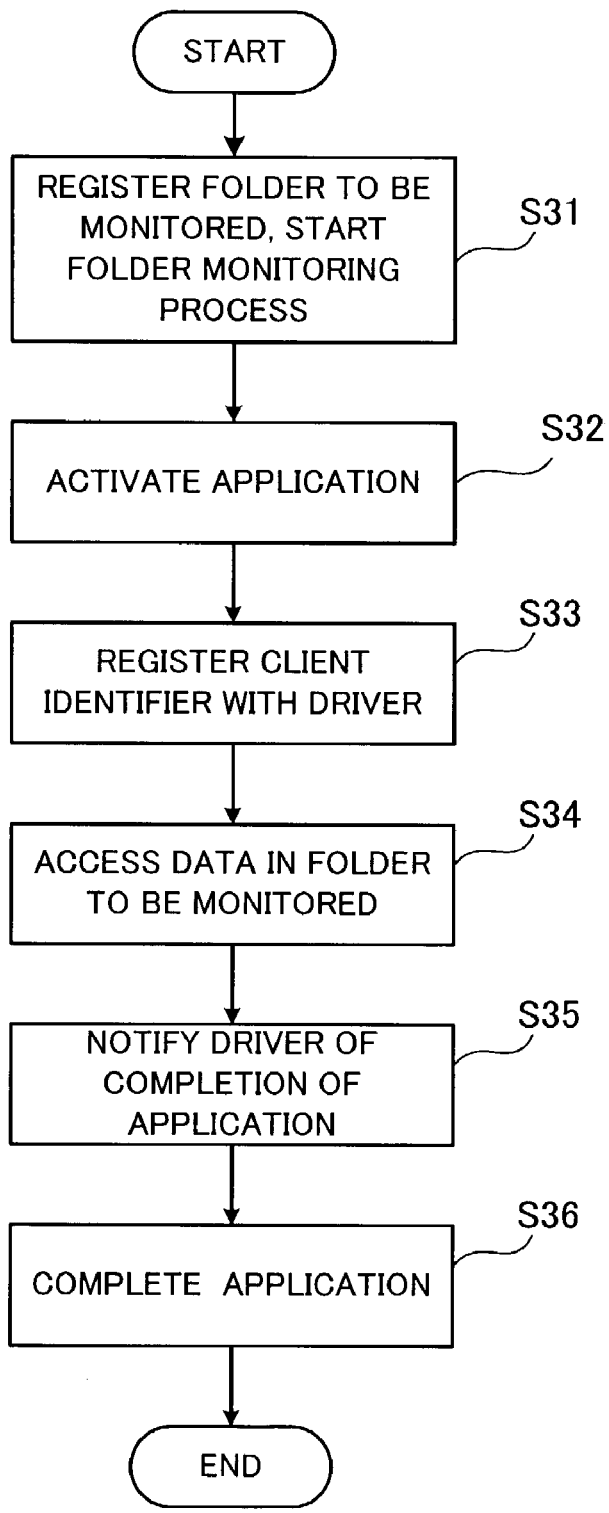
FIG. 8 is a flowchart of showing an overall work flow of the embodiment of the present invention.

FIG. 8 is a flowchart of showing an overall work flow of the embodiment of the present invention. The work flow shown in FIG. 8 is applicable when a processing function such as a function to register a client identifier can be incorporated in the application 230. To package a processing function in the application 230, a necessary processing function should be prepared as a library (general-purpose functions and programs for use in a plurality of pieces of software), and it is required to set the library to be executed when the application 230 is in operation. The process shown in FIG. 8 will be described below according to successive step numbers.

[Step S31] When a user enters a password and applies a control input to activate the application 230, the application 230 registers via the driver 240 the folder to be monitored and starts a folder monitoring process. Specifically, the application 230 registers identification information about a folder to be set as a resource to be protected in the protection resource management table 220. The folder to be set as a resource to be protected may be a desired folder specified by the user or a prescribed folder for the application 230. This registering process is carried out only once when a folder is initially specified as an object to be monitored. In response to the registering process, the driver 240 carries out a process of registering the folder to be monitored.

Specifically, it is assumed that information about resources to be protected and information about application programs which are allowed to access those resources to be protected have been associated with each other and registered in a table file, and that information of users (including passwords and user identifiers) who are authorized to use each of the application programs has been registered as authentication information in the table file. When a user enters a password and applies a control input to activate the application 230, the user is authenticated depending on whether the user password is registered in the table file of authentication information or not. If the user is verified as a legitimate user by the user authentication, then a resource to be protected to which access is permitted from the application program that the user is authorized to use is determined based on the table file which contains the information about resources to be protected and the information about application programs in association with each other. Then the resource name (folder name) of the resource to be protected is registered in the protection resource management table 220.

[Step S32] After the folder to be monitored is registered and the folder monitoring process is started, the application 230 activates a function (e.g., a word processor) to be performed in response to the control input applied by the user. Such a function is activated as a process. The process is allocated identification information (process ID) by the OS.

[Step S33] The application 230 outputs a registration request to register the process ID which is allocated when the process is activated, to the driver 240. In response to the registration request, the driver 240 carries out an application registering process.

In the application registering process, the process ID is registered as a client identifier in the access permission management table 210 which is managed by the driver 240. At this time, a key corresponding to the password that has been entered by the user is generated by the application 230. The generated key is registered in association with the client identifier in the access permission management table 210. Identification information about a folder which has been specified as the resource to be protected in step S31 is registered as a resource to which access is permitted, in association with the client identifier in the access permission management table 210.

[Step S34] The application 230 outputs an access request, such as a request to read a file or a request to write a file, for a file in the folder to be monitored, via the driver 240. In response to the access request, the driver 240 performs an accessing process. If data in the file is read, then the driver 240 decrypts the file. If data is written in the file, then the driver 240 encrypts the file.

[Step S35] The application 230 notifies the driver 240 of completion of the application, i.e., sends an application registration canceling request to the driver 240. In response to the application registration canceling request, the driver 240 performs a process of canceling the registration of the application. Specifically, the driver 240 deletes the client identifier corresponding to the application 230 and the key and folder identification information associated with the client identifier from the access permission management table 210.

[Step S36] The application 230 is put to an end. Details of the processing steps that are carried out by the driver 240 when a processing request is issued from the application 230 according to the sequence shown in FIG. 8 will be described below.

First, details of the process of registering a folder to be monitored in step S31 will be described below.

Figure 9:
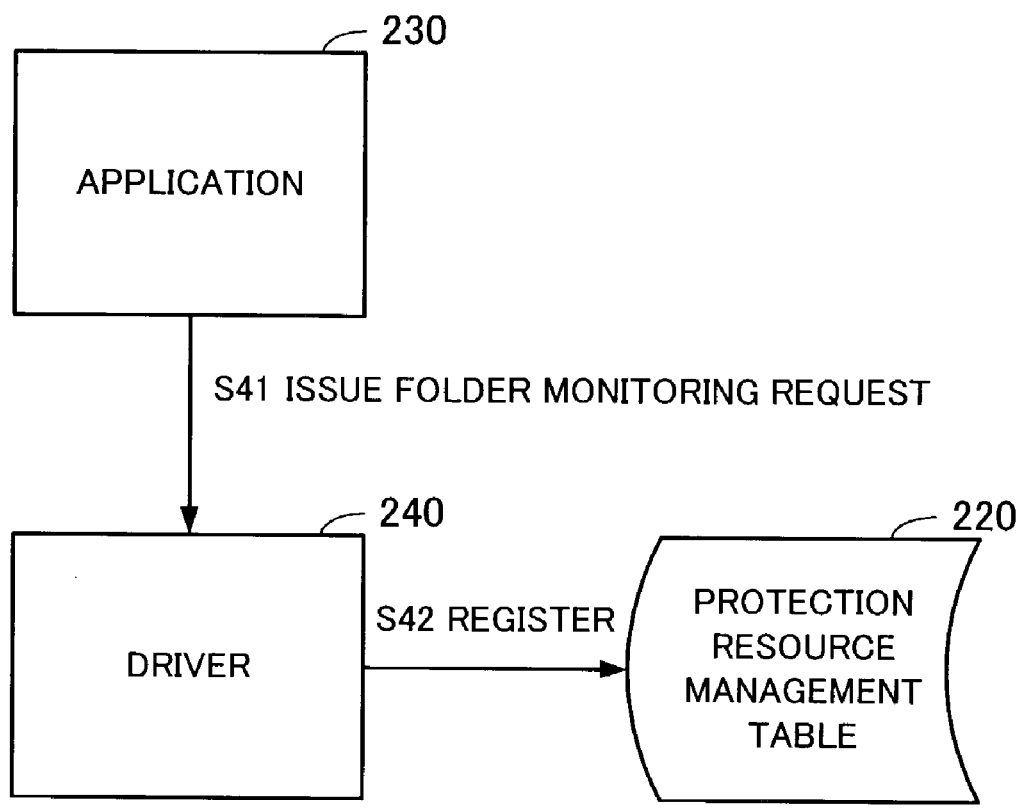
FIG. 9 is a conceptual diagram showing a process of registering a folder to be monitored.

FIG. 9 conceptually shows the process of registering a folder to be protected. As shown in FIG. 9, the application 230 issues a folder monitoring request to the driver 240 in step S41. Then, the driver 240 registers identification information about a folder as information about a resource to be protected in the protection resource management table 220 in step S42.

Figure 10:
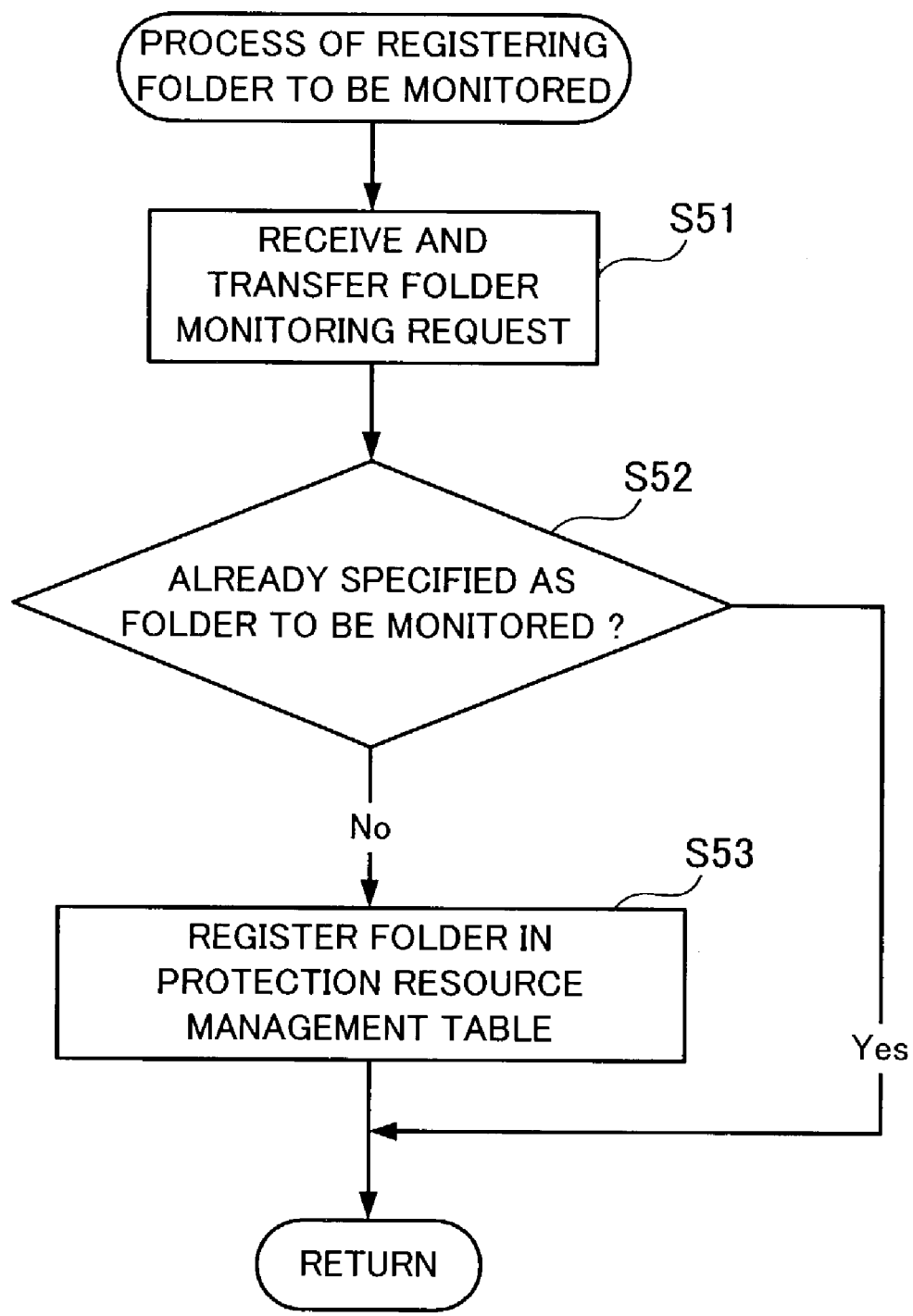
FIG. 10 is a flowchart of a processing sequence of the process of registering a folder to be monitored.

FIG. 10 shows a processing sequence of the process of registering a folder to be protected. The processing sequence shown in FIG. 10 will be described below according to successive step numbers.

[Step S51] The driver 240 receives a folder monitoring request outputted from the application 230. The driver 240 transfers the received folder monitoring request to the data table setting unit 241. The folder monitoring request transferred to the table data setting unit 241 includes identification information about a folder to be monitored.

[Step S52] The table data setting unit 241 determines whether the folder specified to be monitored is a folder which has already been an object to be monitored or not. Specifically, the table data setting unit 241 refers to the protection resource management table 220 and determines whether the identification information about the folder which is specified to be monitored by the folder monitoring request has already been registered in the protection resource management table 220 or not. If the identification information about the folder has already been registered in the protection resource management table 220, then the folder has already been an object to be monitored. If not, then the folder has not been an object to be monitored. If the folder specified to be monitored has already been an object to be monitored, then the processing returns to the application 230. If the folder specified to be monitored has not been an object to be monitored, then the processing goes to step S53.

[Step S53] The table data setting unit 241 registers the identification information about the folder specified by the folder monitoring request in the protection resource management table 220. Thereafter, the processing returns to the application 230.

Details of the application activating process in step S32 will be described below.

Figure 11:
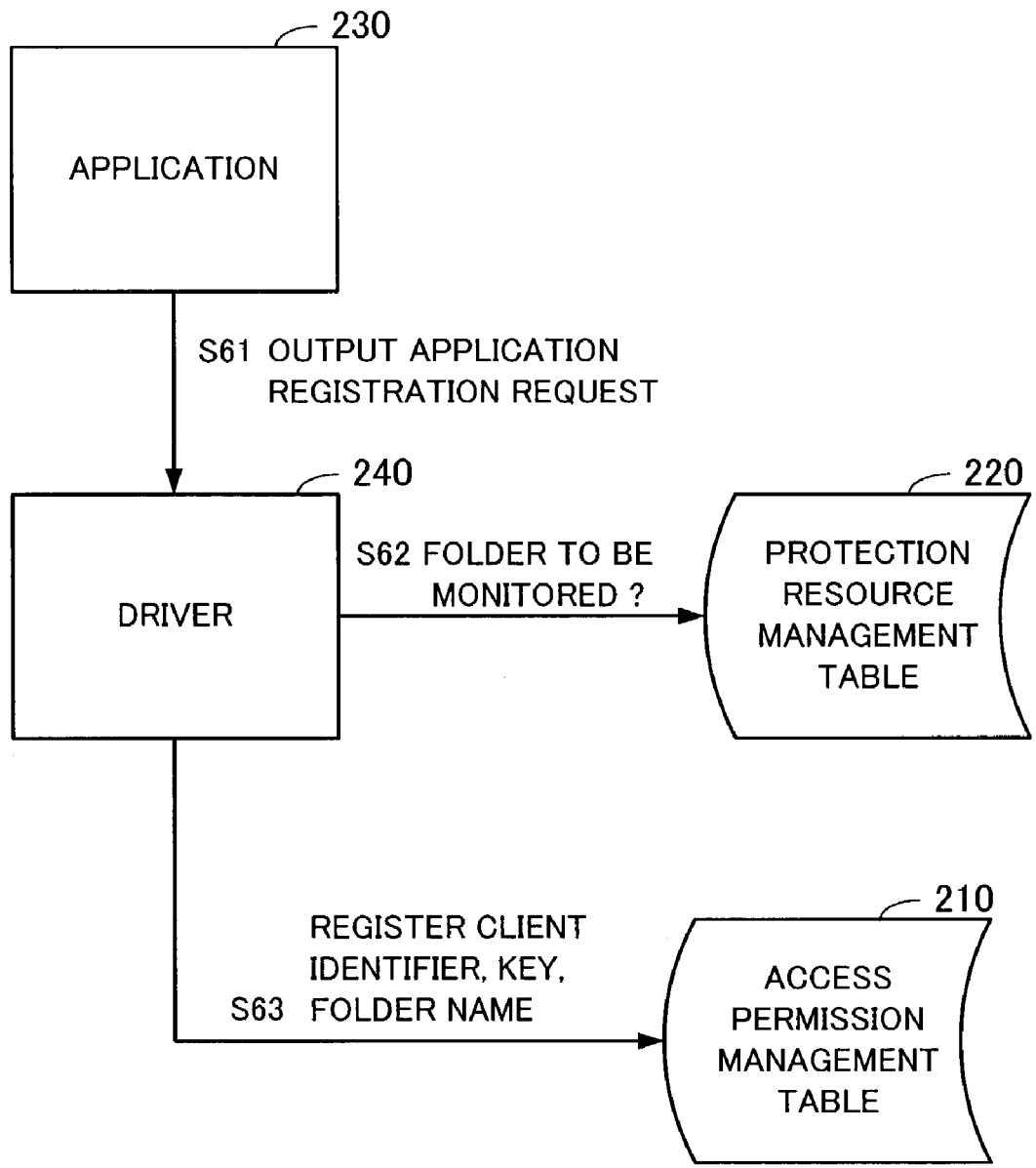
FIG. 11 is a conceptual diagram showing a process of registering an application.

FIG. 11 conceptually shows a process of registering an application. The application 230 outputs an application registration request to register an application in step S61. The driver 240 refers to the protection resource management table 220 and confirms whether the folder contained in the application registration request is to be monitored or not in step S62. If a folder to be monitored, then the driver 240 registers a client identifier, a key, and a folder name in the access permission management table 210 in step S63.

Figure 12:
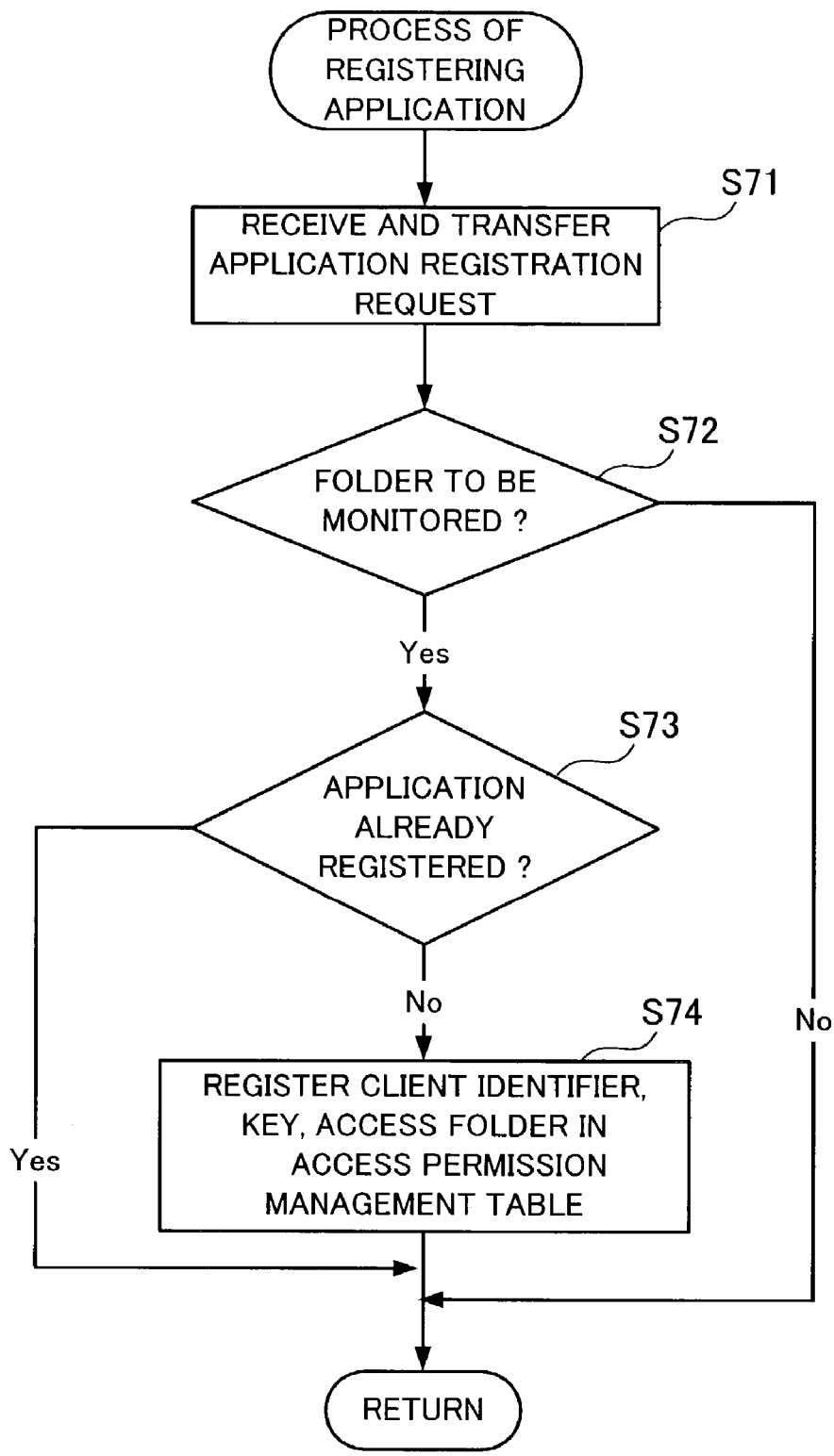
FIG. 12 is a flowchart of a processing sequence of the process of registering an application.

FIG. 12 shows a processing sequence of the process of registering an application. The processing sequence shown in FIG. 12 will be described below according to successive step numbers.

[Step S71] The driver 240 receives an application registration request outputted from the application 230. The driver 240 transfers the received application registration request to the table data setting unit 241. The application registration request transferred to the table data setting unit 241 includes a client identifier, a key, and identification information about a folder to which access is permitted (access folder).

[Step S72] The table data setting unit 241 determines whether the access folder is an object to be monitored or not. Specifically, the table data setting unit 241 determines whether the identification information about the access folder has been registered in the protection resource management table 220 or not. If the identification information about the access folder has been registered, then the access folder is an object to be monitored. If not, then the access folder is not an object to be monitored. If the access folder is an object to be monitored, then the processing goes to step S73. If the access folder is not an object to be monitored, then the processing returns to the application 230.

[Step S73] The table data setting unit 241 determines whether the client identifier of the application 230 has been registered in the access permission management table 210 or not. If registered, then the processing returns to the application 230. If not registered, then the processing goes to step S74.

[Step S74] The table data setting unit 241 registers the set of the client identifier, key, and access folder, which are included in the application registration request, in the access permission management table 210. Thereafter, the processing returns to the application 230. The file accessing process in step S34 will be described in detail below.

Figure 13:
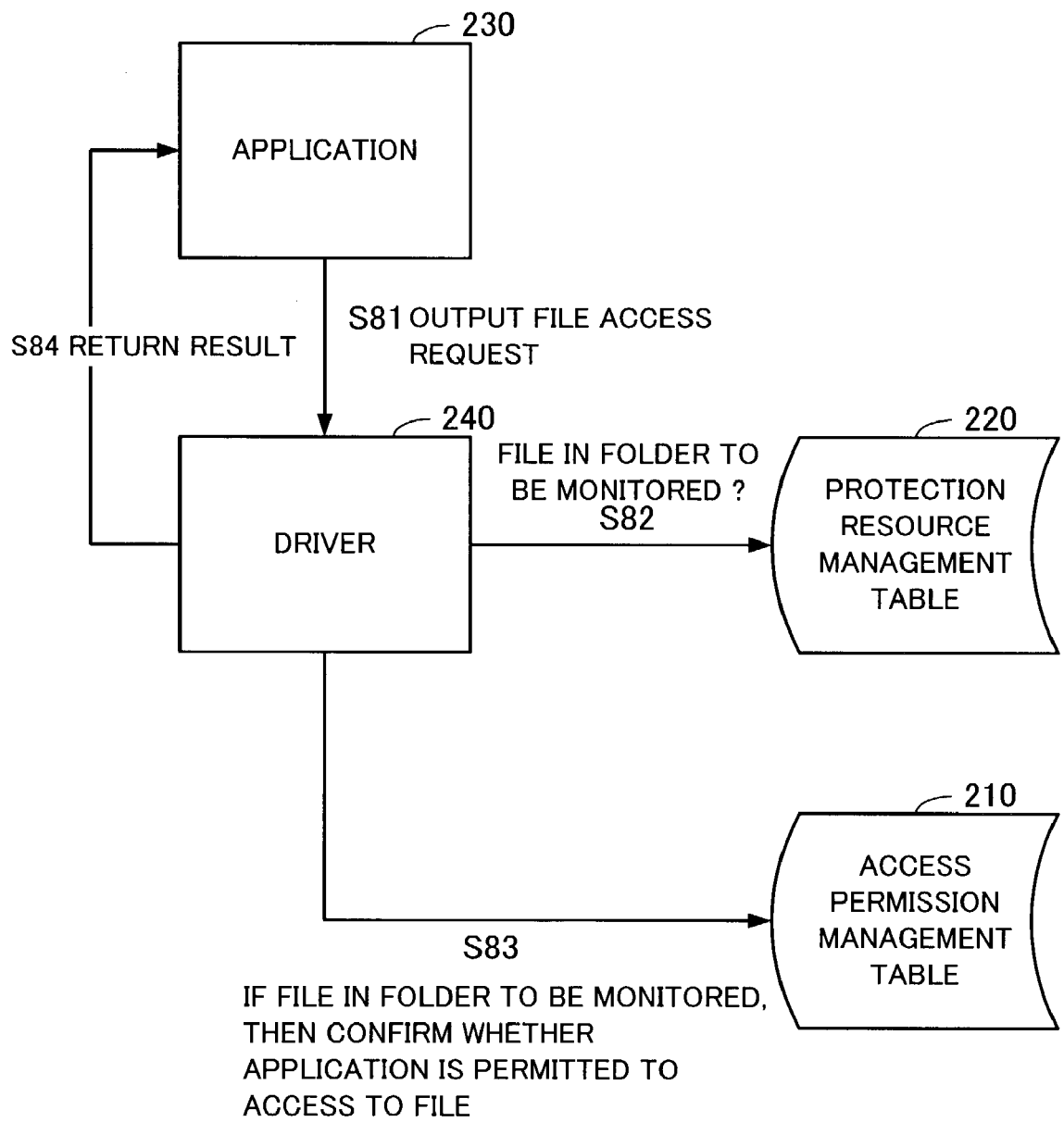
FIG. 13 is a conceptual diagram showing a process of accessing a file.

FIG. 13 conceptually shows a process of accessing a file. The application 230 outputs a file access request in step S81. The file access request is received by the driver 240. The driver 240 refers to the protection resource management table 220, and confirms whether the file to be accessed in response to the file access request is a file in the folder to be monitored or not in step S82. If the file to be accessed is a file in the folder to be monitored, then the driver 240 refers to the access permission management table 210 and confirms whether access to the file by the application 230 which has outputted the file access request is permitted or not in step S83. If access to the file by the application 230 is permitted, then the driver 240 accesses the file in response to the file access request, and returns the result to the application 230 in step S84.

Figure 14:
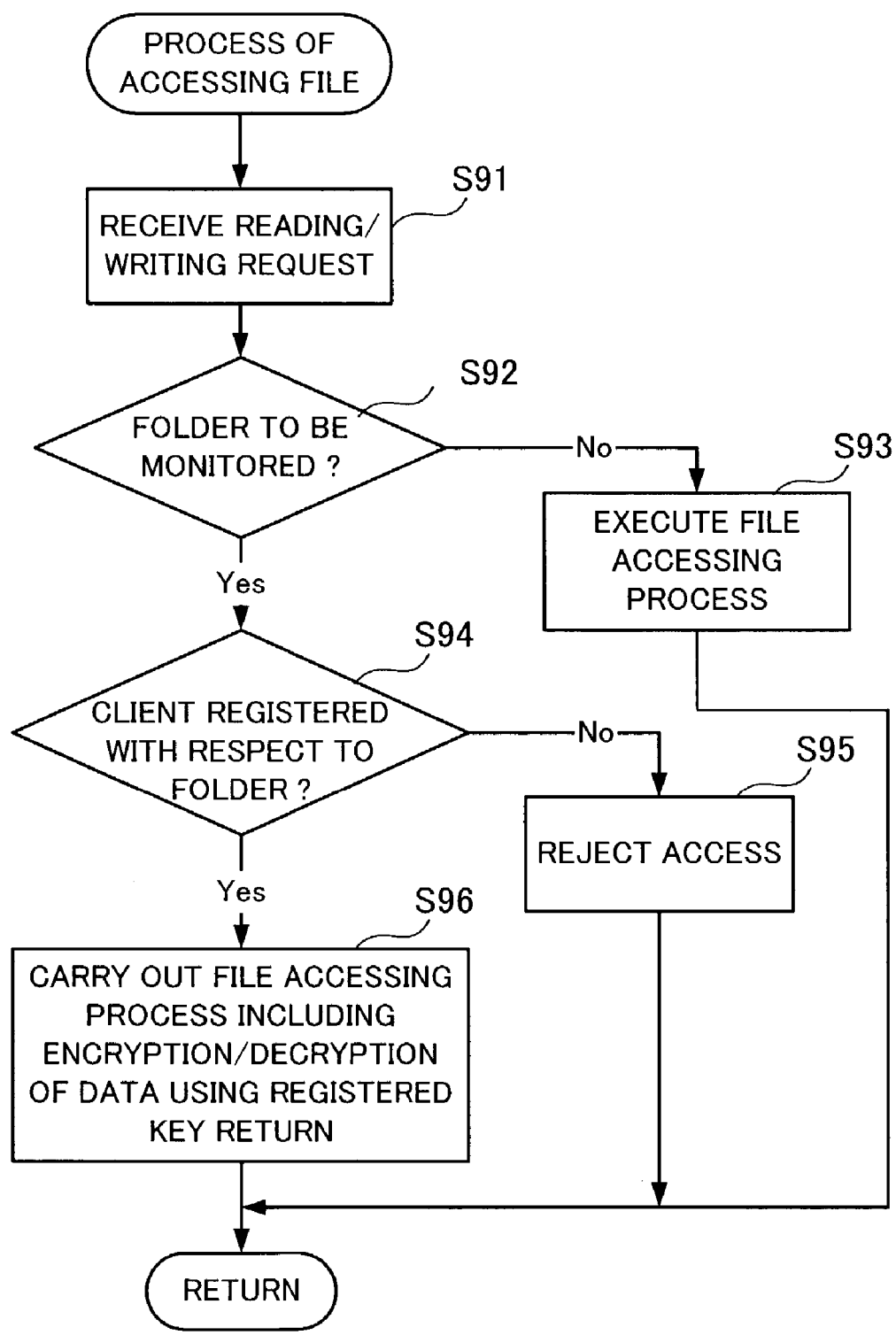
FIG. 14 is a flowchart of a processing sequence of the process of accessing a file.

FIG. 14 shows a processing sequence of the process of accessing a file. The processing sequence shown in FIG. 14 will be described below according to successive step numbers.

[Step S91] The driver 240 receives a file access request outputted from the application 230. The received file access request is transferred to the encryption/decryption determining unit 242. The file access request includes information representing a file name, a file location (identification information about the folder in which the file is stored), an instruction statement indicative of whether the file access request is a request to read or write data, and data to be written (if the file access request is a request to write data).

[Step S92] The encryption/decryption determining unit 242 determines whether the folder in which the file to be accessed is located is a folder to be monitored or not. Specifically, the encryption/decryption determining unit 242 refers to the protection resource management table 220 and determines whether identification information about the folder in which the file to be accessed is located has been registered in the protection resource management table 220 or not. If registered, then the folder in which the file to be accessed is located is a folder to be monitored. If not, then the folder in which the file to be accessed is located is not a folder to be monitored. If the folder in which the file to be accessed is located is a folder to be monitored, then the processing goes to step S94. If the folder in which the file to be accessed is located is not a folder to be monitored, then the processing goes to step S93.

[S93] The driver 240 executes a file accessing process depending on the file access request with a file system incorporated in the OS.

[Step S94] The access permission/inhibition determining unit 243 refers to the access permission management table 210 and determines whether the application 230 which has outputted the file access request has been registered with respect to the folder to be monitored.

Specifically, the access permission/inhibition determining unit 243 acquires the process ID of the application 230 which has outputted the file access request. The process ID is managed by the OS, so that the access permission/inhibition determining unit 243 can acquire the process ID by asking the OS. The access permission/inhibition determining unit 243 determines whether the set of the process ID of the application 230 and the identification information about the folder which is the location of the file to be accessed has been registered in the access permission management table 210 or not. If the set of the process ID and the identification information about the folder has been registered in the access permission management table 210, then the access permission/inhibition determining unit 243 can judge that the application 230 is a registered client.

If the application 230 is a registered client, then the processing goes to step S96. If the application 230 is not a registered client, then the processing goes to step S95.

[Step S95] The access permission/inhibition determining unit 243 rejects the file access request from the application 230, and returns the result to the application 230. Thereafter, the processing returns to the application 230.

[Step S96] The access permission/inhibition determining unit 243 indicates that the file access request is permitted to the encryption/decryption processor 244. The encryption/decryption processor 244 acquires a key associated with the set of the process ID of the application 230 and the identification information about the folder which is the location of the file to be accessed, from the access permission management table 210. The encryption/decryption processor 244 then carries out a file accessing process including file encryption or decryption on the file to be accessed, using the acquired key.

Specifically, if the file access request is a request to read the file, then the encryption/decryption processor 244 decrypts the file to be accessed with the acquired key, and transfers the decrypted file to the application 230. If the file access request is a request to write the file, then the encryption/decryption processor 244 encrypts the data to be written with the acquired key, forms a file thereof, and stores the file in the folder to be monitored. Thereafter, the processing returns to the application 230.

The process of canceling the registration of an application in step S35 will be described below.

Figure 15:
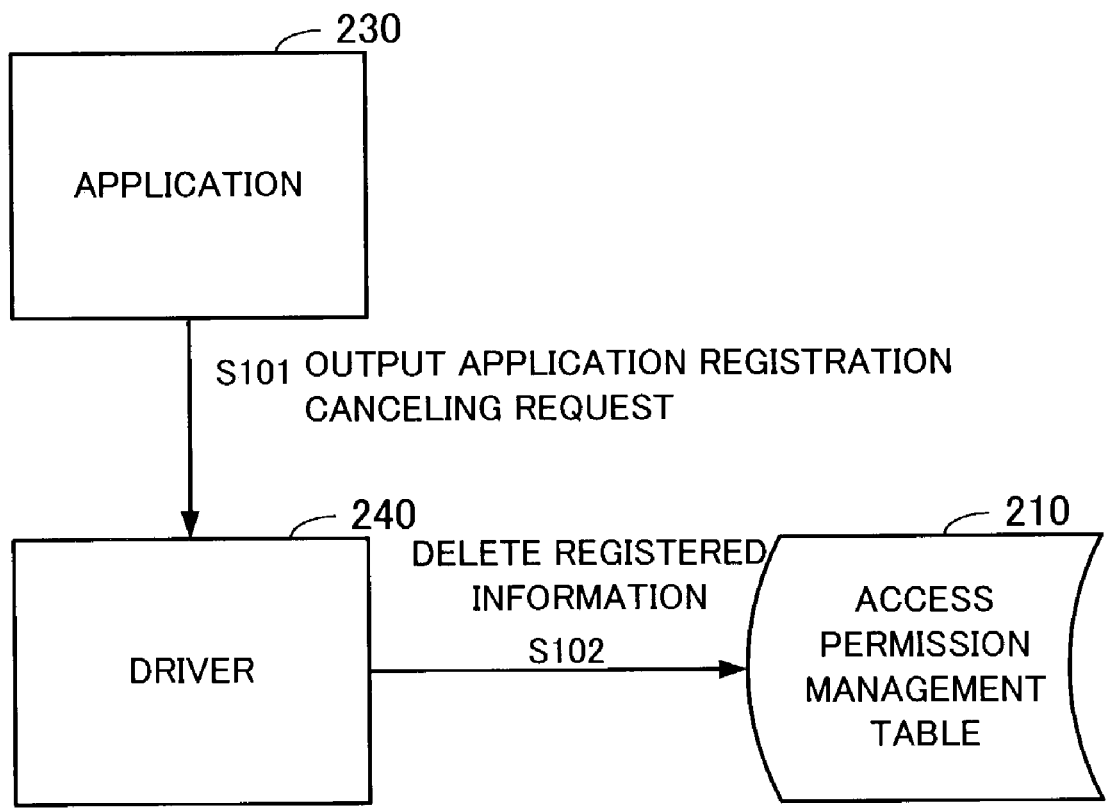
FIG. 15 is a conceptual diagram showing a process of canceling the registration of an application.

FIG. 15 conceptually shows a process of canceling the registration of an application. The application 230 outputs an application registration canceling request in step S101. The driver 240 deletes information registered in the access permission management table 210 in step S102.

Figure 16:
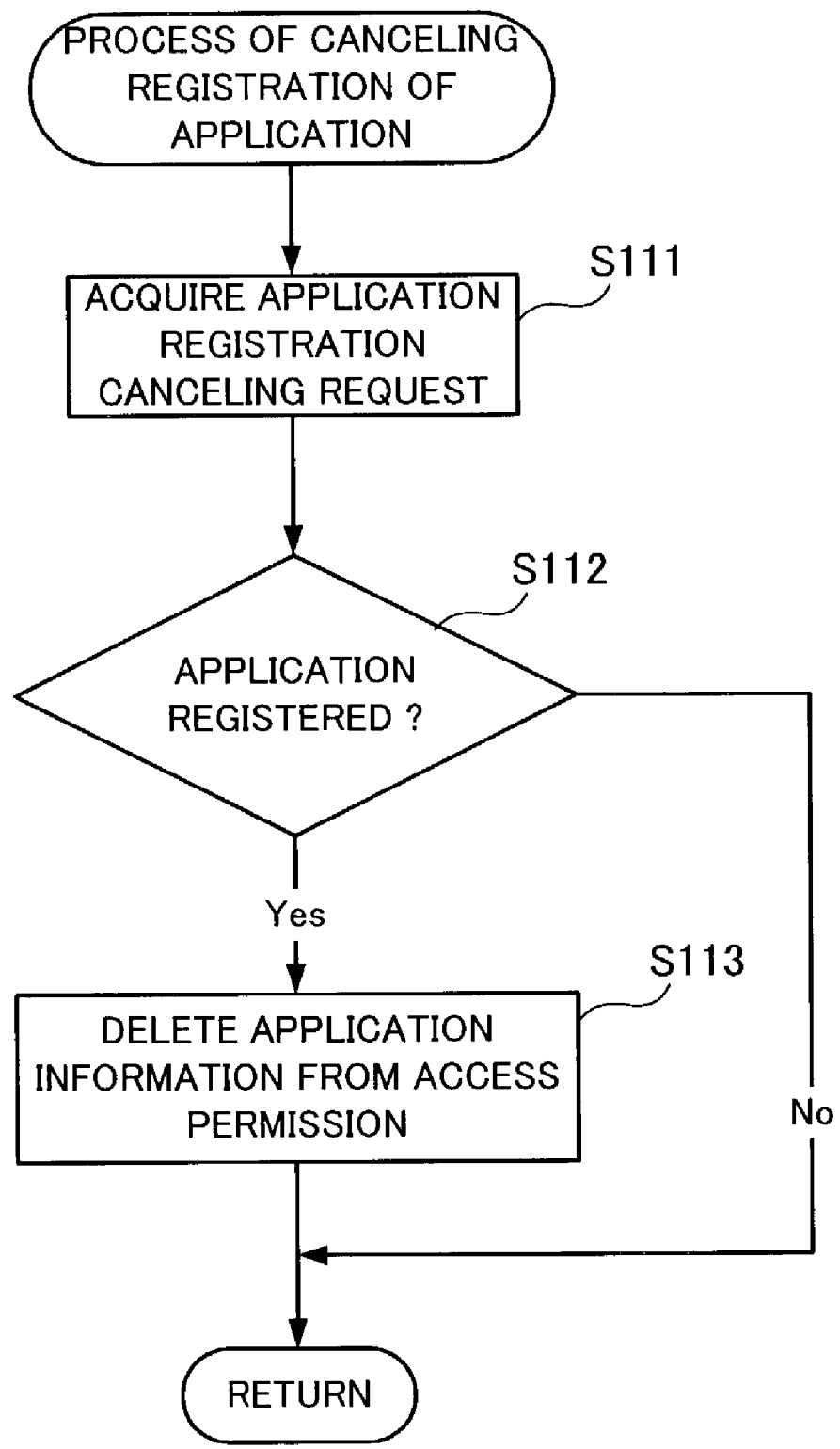
FIG. 16 is a flowchart of a processing sequence of the process of canceling the registration of an application.

FIG. 16 is a flow chart showing a processing sequence of the process of canceling the registration of an application. The processing sequence shown in FIG. 16 will be described below according to successive step numbers.

[Step S111] The driver 240 acquires an application registration canceling request from the application 230. The driver 240 transfers the acquired application registration canceling request to the table data setting unit 241.

[Step S112] The table data setting unit 241 determines whether the process ID of the application 230 has been registered in the access permission management table 210 or not. If registered, then the processing goes to step S113. If not registered, then the processing returns to the application 230.

[Step S113] The table data setting unit 241 deletes the process ID of the application 230 and data associated with the process ID (the key and the folder identification information) from the access permission management table 210. Thereafter, the processing returns to the application 230.

On the other hand, keys that can be used in encrypting/decrypting data may be, instead of inputs, used as parameters, from the application 230, group keys assigned to groups of users, and values (specific hardware/environment values) unique to local machines on which the file protection system operates, the values being involved in a key generation logic. The specific hardware/environment values may be hard disk IDs, hard token IDs, etc., for example.

Figure 17:
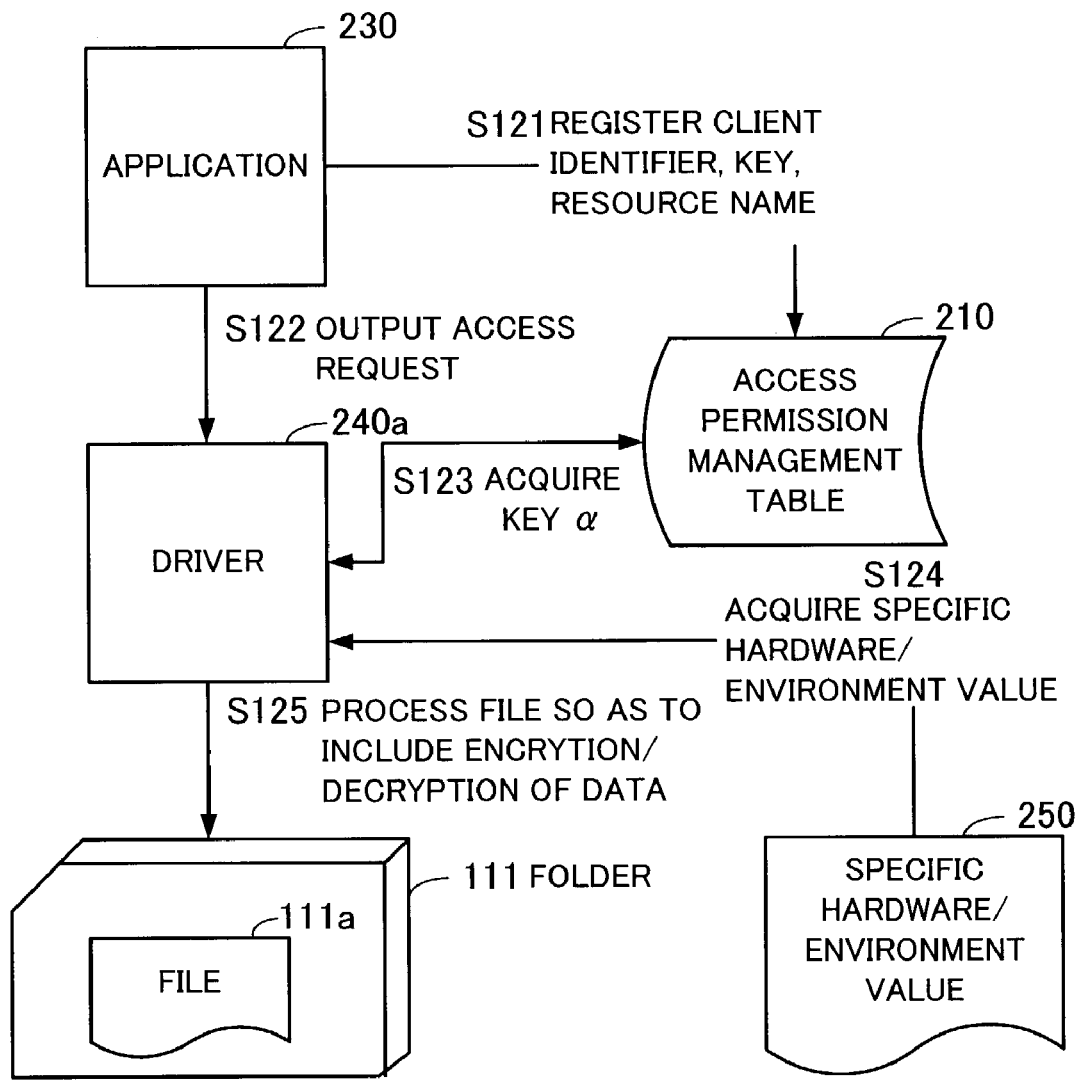
FIG. 17 is a diagram schematically showing an accessing process for protecting a file using a specific hardware/environment value.

FIG. 17 shows an accessing process for protecting a file using a specific hardware/environment value. The accessing process shown in FIG. 17 is similar to the accessing process shown in FIG. 6 except that a specific hardware/environment value 250 is added.

When the user activates the application 230 and enters a proper password as user authentication information, the application 230 registers a client identifier, a key, and a resource name in the access permission management table 210 in step S121. Thereafter, the application 230 outputs an access request for the file 111a in the folder 111 in step S122.

The driver 240a acquires the process ID of the application 230 in response to the access request which is outputted from the application 230. The driver 240a refers to the access permission management table 210, and acquires therefrom a key α corresponding to the client identifier corresponding to the acquired process ID in step S123. The driver 240a also acquires a specific hardware/environment value 250 in step S124.

The driver 240a uses the acquired specific hardware/environment value 250 as assistive information for generating an encryption key or a decryption key (key generating assistive information). Specifically, the driver 240a combines the key α acquired from the access permission management table 210 and the specific hardware/environment value 250, thus generating a new key. The driver 240 then executes processing, which includes encrypting or decrypting the data with the generated new key, of the file 111a specified by the access request in step S125.

Since an encryption/decryption key is generated using the specific hardware/environment value 250, a resource to be protected can be accessed only by one computer and hence can be protected with increased security against unauthorized accessing attempts via networks.

The work flow shown in FIG. 8 is applied where a function to protect files with a library is incorporated in the application 230. However, a function to protect files may be performed by a launcher application.

Figure 18:
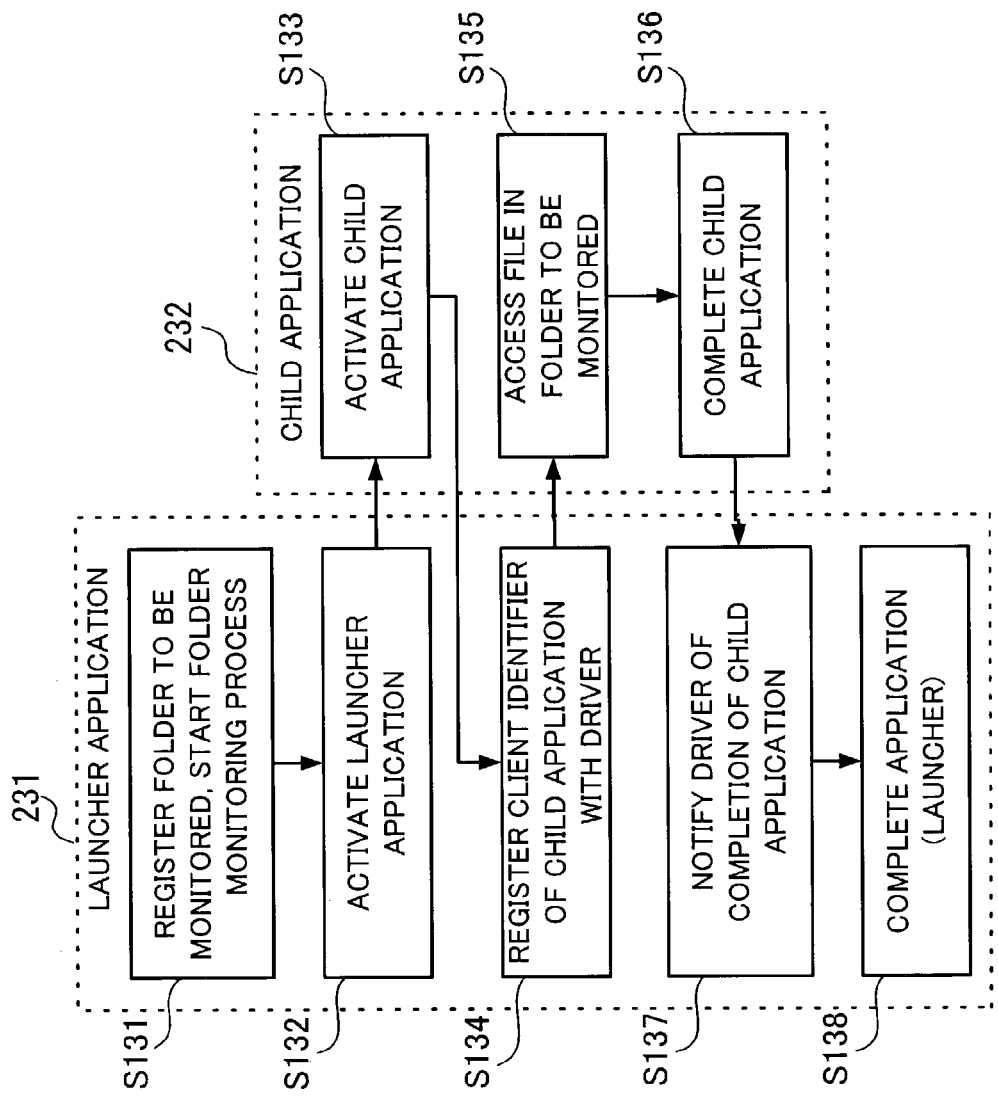
FIG. 18 is a flowchart of showing an overall work flow of a file protection process using a launcher application.

FIG. 18 shows a work flow of a file protection process using a launcher application. In the example shown in FIG. 18, a launcher application 231 and a child application 232 are provided. The launcher application 231 serves as an assistive function for activating various applications in response to a control input from the user. The child application 232 is an application that is activated by the launcher application 231. The child application 232 may be a word processor, a spreadsheet program, etc.

[Step S131] When the user enters a password and applies a control input to request the launcher application 231 to activate the child application 232, the launcher application 231 registers a folder to be monitored and starts a folder monitoring process. Specifically, the launcher application 231 registers identification information about a folder to be set as a resource to be protected in the protection resource management table 220 via the driver 240. The folder to be set as a resource to be protected may be a folder optionally specified by the user or a prescribed folder for the application 230. This registering process is carried out only once when a folder is initially specified as an object to be monitored.

[Step S132] After the folder to be monitored is registered and the folder monitoring process is started, the launcher application 231 is activated.

[Step S133] The launcher application 231 outputs a request to activate the child application 232 to the OS, and the child application 232 is activated.

[Step S134] The launcher application 231 registers a process ID allocated at the time the child application 232 is activated, as a client identifier in the access permission management table 210 which is managed by the driver 240. At this time, a key depending on the password entered by the user is generated by the application 230. The generated key is registered in association with the client identifier registered in step S134 in the access permission management table 210. Identification information about a folder which has been specified as the resource to be protected in step S131 is registered as a resource to which access is permitted, in association with the client identifier registered in step S134 in the access permission management table 210.

[Step S135] The child application 232 accesses a file in the folder to be monitored, i.e., reads data from the file or write data in the file, via the driver 240. When data in the file is read, the driver 240 decrypts the data. When data is written in the file, the driver 240 encrypts the file.

[Step S136] The child application 232 is put to an end in response to a control input applied by the user.

[Step S137] When the child application 232 is ended, the launcher application 231 notifies the driver 240 of the completion of the child application 232. The driver 240 deletes the client identifier corresponding to the application 230 and the key and folder identification information associated with the client identifier from the access permission management table 210.

[Step S138] The launcher application 231 is put to an end.

According to the embodiment of the present invention, as described above, an application to be monitored is registered in advance, and the driver 240 selectively controls and determines access from applications to reject access from applications which have not been registered. Therefore, access to files can easily be restricted.

The system administrator makes it possible to monitor unauthorized leakage of information by allowing files to be processed within the scope of a function of an application which is permitted to access the files, and rejecting access to files for processing them otherwise.

Even an user who is permitted to access a file to be protected is inhibited from processing the file with an invalid operation, i.e., an access request from an application which is not permitted to access the file.

Even with the driver 240 itself removed, a file encrypted by a registered application cannot be decrypted when an attempt is made by another application to decrypt the file. This is because when an application is registered, a key (used as an encryption key or a decryption key) which can be used only by the application is established.

Since different keys are allocated to respective applications which are permitted to access a file, an attempt to decrypt the file with an application which is permitted to access the file, but not registered, fails to decrypt the file properly. As a result, only the authorized user of a registered application can properly decrypt file information, and can correct and copy the file information according to the functions of the application.

As well as applications newly produced for use in the system according to the present invention, conventional programs can easily be incorporated in the system by using an agent program (launcher application) for managing the activation, state, and completion of those conventional programs. Consequently, existing applications can be used as applications of the present embodiment without being modified.

If a process of generating a key is determined with respect to each application, then it becomes possible to easily plan and operate, for each application, the interoperability and exclusiveness in relation to files in the resources to be protected. Therefore, it is made possible to control the setting of information sharing in a group of users for a desired application.

With the above selective access control capability, it is possible to construct a system for operating and managing file information with bottom-up selective access control and easy planning combined with top-down robustness and higher security.

To perform the above processing functions, there is provided a data protection program which is descriptive of processing details of functions which a computer should have. When the data protection program is executed by the computer, the above processing functions are carried out on the computer. The data protection program which is descriptive of processing details can be recorded on a recording medium which can be read by the computer. The recording medium which can be read by the computer include a magnetic recording device, an optical disk, a magneto-optical recording medium, a semiconductor memory, and the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disc Read Only Memory), a CD-R (Recordable)/RW (ReWritable), or the like. The magneto-optical recording medium may be an MO (Magneto-Optical) disc or the like.

For distributing the data protection program, portable recording mediums such as DVDs, CD-ROMs, etc. which store the data protection program are put on sale.

Alternatively, the data protection program may be stored in a storage device of a server computer, and transferred from the server computer to another computer via a network.

The computer for executing the data protection program loads the data protection program recorded on a portable recording medium or transferred from the server computer, for example, into its own storage device. Then, the computer reads the data protection program from the storage device, and performs a processing sequence according to the data protection program. Alternatively, the computer may directly read the data protection program from the portable recording medium and perform a processing sequence according to the server program. Further alternatively, the computer may perform a processing sequence according to the data protection program each time the computer receives a fraction of the data protection program transferred from the server computer.

According to the present invention, as described above, only when identification information about a request source program which has outputted an access request has been registered in an access permission management table, access to data in a resource to be protected based on the access request is permitted and the data in the resource to be protected is processed according to the access request. Therefore, even when the data in the resource to be protected is in a state accessed by an application which is permitted to access the data, access to the data in the resource to be protected from other applications whose identification information has not been registered in the access permission management table is rejected. As a result, the security of the data in the resource to be protected is increased.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing therein a data protection program for protecting data stored in a resource to be protected, said data protection program enabling a computer to carry out a processing sequence comprising:

when a program capable of accessing said resource to be protected starts, registering a process ID of a process operating as said program capable of accessing said resource to be protected in an access permission management table;

generating, by the process operating as said program capable of accessing said resource to be protected, a key that is uniquely determined depending on a password entered by a user;

registering said key associated with the process ID of the process operating as said program capable of accessing said resource to be protected in said access permission management table;

if an access request to access said resource to be protected is received, by a driver, acquiring a process ID of a process operating as a request source program which has outputted said access request;

determining whether access to said resource to be protected is permitted or not based on whether the process ID of the process operating as said request source program has been registered in said access permission management table or not;

if access to said resource to be protected is permitted, processing data in said resource to be protected in response to said access request; and when said program capable of accessing said resource to be protected ends, deleting said process ID of said process operating as said program capable of accessing said resource to be protected from said access permission management table;

wherein when the data in said resource to be protected is processed, if said access request is a request to write data, then data transferred from a process which executes said request source program is encrypted and then stored in said resource to be protected, and if said access request is a request to read data, data from said resource to be protected is decrypted and then transferred to a process which executes said request source program;

and wherein when the data in said resource to be protected is to be encrypted and decrypted, encrypting and decrypting, by said driver, the data using said key registered in said access permission management table in association with the process ID of the process which executed said request source program.

2. The computer-readable medium according to claim 1 wherein said processing sequence further comprises:

when data in said resource to be protected is to be encrypted and decrypted, encrypting and decrypting the data using a value provided by combining said key associated with the process ID about the request source program and a specific value preset in said computer.

3. The computer-readable medium according to claim 1, wherein said processing sequence further comprises:

registering process ID about a folder, which contains data to be protected, in a protection resource management table; and using only said folder registered in said protection resource management table as said resource to be protected.

4. A method of protecting data stored in a resource to be protected, said method comprising:

when a program capable of accessing said resource to be protected starts, registering a process ID of a process operating as said program capable of accessing said resource to be protected in an access permission management table;

generating, by the process operating as said program capable of accessing said resource to be protected, a key that is uniquely determined depending on a password entered by a user;

registering said key associated with the process ID of the process operating as said program capable of accessing said resource to be protected in said access permission management table;

if an access request to access said resource to be protected is received, by a driver, acquiring a process ID about a request source program which has outputted said access request;

determining whether access to said resource to be protected is permitted or not based on whether the process ID of the process operating as said request source program has been registered in said access permission management table or not;

if access to said resource to be protected is permitted, processing data in said resource to be protected in response to said access request; and when said program capable of accessing said resource to be protected ends, deleting said process ID of said process operating as said program capable of accessing said resource to be protected from said access permission management table;

wherein when the data in said resource to be protected is processed, if said access request is a request to write data, then data transferred from a process which executes said request source program is encrypted and then stored in said resource to be protected, and if said access request is a request to read data, data from said resource to be protected is decrypted and then transferred to a process which executes said request source program;

and wherein when the data in said resource to be protected is to be encrypted and decrypted, encrypting and decrypting, by said driver, the data using said key registered in said access permission management table is association with the process ID of the process which executes said request source program.

5. An apparatus for protecting data stored in a resource to be protected, said apparatus comprising:

identification information registering means for, when a program capable of accessing said resource to be protected starts, registering a process ID of a process operating as said program capable of accessing said resource to be protected in an access permission management table;

generating means, achieved by the process operating as said program capable of accessing said resource to be protected, for generating a key that is uniquely determined depending on a password entered by a user;

registering means for registering said key associated with the process ID of the process operating as said program capable of accessing said resource to be protected in said access permission management table;

identification information acquiring means included in a driver for, if an access request to access said resource to be protected is received, acquiring said process ID about a request source program which has outputted said access request;

access permission/inhibition determining means for determining whether access to said resource to be protected is permitted or not based on whether the a process ID of a process operating as said request source program has been registered in said access permission management table or not;

data processing means for, if access to said resource to be protected is permitted, processing data in said resource to be protected in response to said access request;

identification information deleting means for, when said program capable of accessing said resource to be protected ends, deleting said process ID of said process operating as said program capable of accessing said resource to be protected from said access permission management table;

data processing means for, when the data in said resource to be protected is processed, if said access request is a request to write data, then data transferred from a process which executes said request source program is encrypted and then stored in said resource to be protected, and if said access request is a request to read data, data from said resource to be protected is decrypted and then transferred to a process which executes said request source program; and encryption/decryption processing means included in said driver for, when the data in said resource to be protected is to be encrypted, encrypting and decrypting the data using said key registered in said access permission management table in association with the process ID of the process which executes said request source program.

* * * * *

UNITED STATES PATENT AND TRADEMARK OFFICE
CERTIFICATE OF CORRECTION

PATENT NO. : 7,487,366 B2
APPLICATION NO. : 10/409443
DATED : February 3, 2009
INVENTOR(S) : Yuu Umebayashi et al.

It is certified that error appears in the above-identified patent and that said Letters Patent is hereby corrected as shown below:

Title Page, Column 1, under
Item (65) Prior Publication Data
US 2004/0010701 A1   Jan. 15, 2004" insert
Item --(30) Foreign Application Priority Data
Jul. 9, 2002   (JP) ..................... 2002-199437--.

Column 17, Line 64, change "claim 1" to --claim 1,--.

Column 18, Line 55, after "table" change "is" to --in--.

Column 19, Line 14, change "the a" to --the--.

Column 19, Line 19, change "permitted,processing" to --permitted, processing--.

Signed and Sealed this

Fourteenth Day of April, 2009

JOHN DOLL
*Acting Director of the United States Patent and Trademark Office*